United States Patent [19]

Gombrich et al.

[11] Patent Number: 4,814,759
[45] Date of Patent: Mar. 21, 1989

[54] FLAT PANEL DISPLAY MONITOR APPARATUS

[75] Inventors: Peter P. Gombrich, Boulder; Ernest E. Robbins, Longmont, both of Colo.

[73] Assignee: CliniCom Incorporated, Boulder, Colo.

[21] Appl. No.: 70,942

[22] Filed: Jul. 8, 1987

[51] Int. Cl.$^4$ .......................... G09G 3/22; G09G 3/28
[52] U.S. Cl. .................................................. 340/771
[58] Field of Search ............... 340/700, 717, 752, 756, 340/758, 766, 768, 769, 771, 825.06, 825.29, 815.08, 815.09, 815.24; 364/413, 415, 704, 705, 708; 378/98; 323/911; 128/709, 710; 434/414, 419, 421; 40/493, 497, 508, 509, 530, 531, 533; 312/322; 248/274, 278, 279, 285, 286, 480

[56] References Cited
U.S. PATENT DOCUMENTS

| | | | |
|---|---|---|---|
| 2,825,152 | 10/1954 | Baylon | 434/421 |
| 2,915,944 | 12/1959 | Butts | 248/480 |
| 4,216,462 | 8/1980 | McGrath et al. | 364/415 |
| 4,356,475 | 10/1982 | Neumann et al. | 364/415 |
| 4,667,914 | 5/1987 | Bailey | 248/286 |
| 4,674,107 | 6/1987 | Urban et al. | 378/98 |
| 4,683,465 | 7/1987 | Lake, Jr. et al. | 340/700 |
| 4,687,166 | 8/1987 | Poehler | 248/279 |

Primary Examiner—Gerald L. Brigance
Assistant Examiner—Richard Hjerpe
Attorney, Agent, or Firm—Merchant, Gould, Smith, Edell, Welter & Schmidt

[57] ABSTRACT

A flat panel display monitor which may be secured to a wall includes structure for interacting with a data input device. The monitor further includes a housing and a flat video screen attached to the housing. A support assembly is included for supporting the screen relative to the housing in any one of at least three different positions with respect to the housing.

19 Claims, 6 Drawing Sheets

FLAT PANEL DISPLAY MONITOR APPARATUS

BACKGROUND OF THE INVENTION

The present invention relates to a flat panel display monitor. More particularly, the present invention relates to a flat panel display monitor that can be secured to a wall and that includes means for interacting with a data input device such as the portable handheld terminal including an optical bar code reader disclosed in applicant's U.S. patent application Ser. No. 862,149 filed on May 12, 1986 and herein incorporated by reference. Additionally, the present invention relates to a flat panel display monitor having a novel mechanical configuration which allows the monitor to tilt so that the monitor is visible from any location within a room. The present invention is specifically described with respect to a flat panel display monitor in a hospital room, but the principles involved are also applicable to a flat panel display monitor in any location.

Recently, many hospitals have started to use a bedside computer system to assist hospital staff members with charting and other administrative activities. Such a system must be simple and easy to use to reduce the overall charting and administrative time and increase efficiency. Often times, these bedside computer systems include terminals or PC displays that allow a hospital staff member to interact with a host computer regarding patient data. The terminals or displays require a table or a stand and take up valuable space in the patient's room. Also, the terminal or PC display is only viewable from a limited area in front of the terminal or display.

The present invention solves the problem of a terminal or display taking up valuable space in a patient's room and also solves the problem of a display only being viewable from a limited area in front of the display as well as other problems associated with a computer display in a hospital room.

SUMMARY OF THE INVENTION

The present invention relates to a flat panel display monitor including a housing and a flat video screen which is attached to the housing so that the video screen can be in one of three positions with respect to the housing. The first position being between the second and third positions. The second position is defined as being one in which the second end of the housing and a second end of the video screen are further removed from one another than a first end of the housing and a first end of the video screen. The third position is defined as being one in which the first end of the housing and the first end of the video screen are further removed from one another than the second end of the housing and the second end of the video screen.

A preferred embodiment of the present invention includes a housing which has a stationary section and a movable support member. The video screen is attached to the support member. The stationary housing section and support member are connected by extensible arms so that the support member can be in one of two positions with respect to the stationary section. The first position being one in which the support member is very close to the stationary housing section. The second position being one in which the support member is extended from the stationary housing section.

In the preferred embodiment, the support member is rotatably interconnected to the extensible arms so that the support member and the video screen attached to it can rotate about a horizontal axis so that either the front side of the video screen or the back side of the support member faces outward with respect to the front side of the stationary housing section. In the preferred embodiment, a pin is used to rotatably interconnect the extensible arms to the support member.

In the preferred embodiment of the present invention, a first flat arm is pivotally connected at one end to the first end of the support member and is pivotally connected at the other end to the second end of the video screen. A second flat arm is pivotally connected at one end to the first end of the support member and is pivotally connected at the other end to the first end of the video screen. A third flat arm is connected similarly to the second flat arm and connected so that the first flat arm is between the second and third flat arms. The first, second and third arms are not attached to the support member or the video screen anywhere other than at the ends. The first arm pivots with the video screen when the video screen is moved from the first to the third position with respect to the support member and remains stationary when the video screen is moved from the first to the second position. The second and third arms pivot with the video screen when the video screen is moved from the first to the second position with respect to the support member and remain stationary when the video screen is moved from the first to third position.

In the preferred embodiment of the present invention, hinges are used to pivotably interconnect the first and second arms to the support member and the video screen.

Another feature of the preferred embodiment of the present invention is the provision of a communication port on one ed of the stationary housing so that the video screen can be electrically interconnected to a data input device.

Still another feature of the preferred embodiment of the present invention is that the video screen is a plasma display.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT OF THE INVENTION

Figure 1:
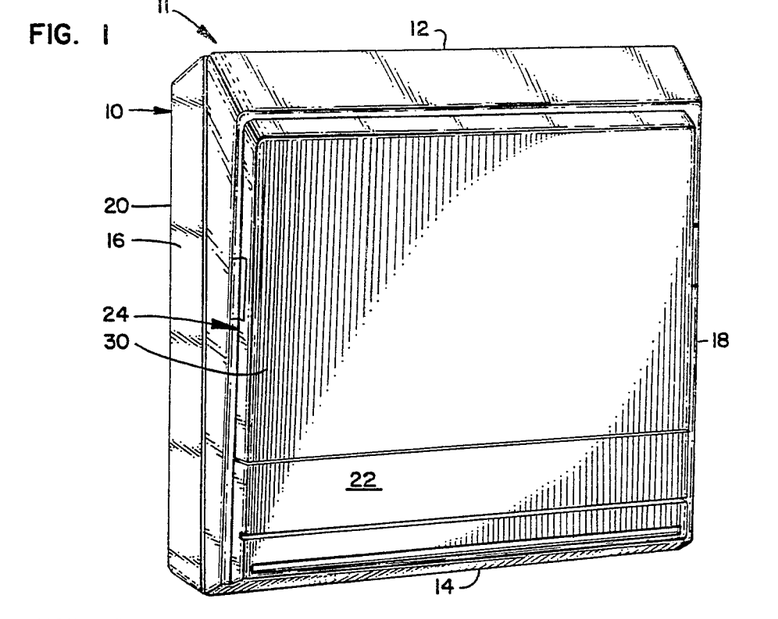
FIG. 1 is a perspective view of a flat panel display monitor in accordance with the principles of the present invention.

Referring now to the drawings wherein embodiments are illustrated in accordance with the principles of the present invention;

FIG. 1 shows a flat panel display monitor 11 of the present invention. Housing 10 is rectangularly shaped with a top 12, bottom 14, side 16 and side 18, which is opposite side 16. Housing 10 has a back side 20 which is substantially flat so that monitor 11 can be mounted on a wall. Reference numeral 30 in FIG. 1 refers to the back side of support member 24 which is housed in housing 10. A lower section 22 of housing 10 houses the electrical circuitry necessary to electrically interconnect monitor 11 to a data input device.

Figure 2:
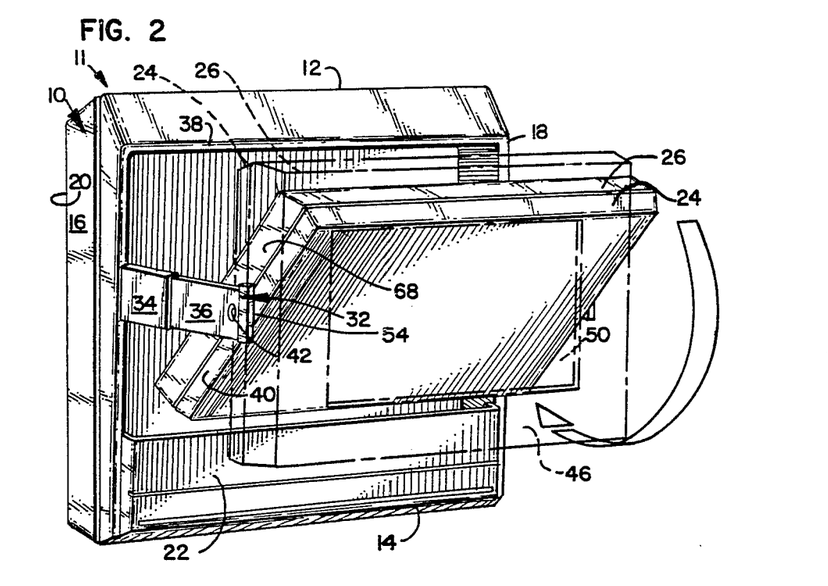
FIG. 2 is a perspective view illustrating the extension and rotation of the video screen of the flat panel display monitor of the preferred embodiment in accordance with the principles of the present invention.

FIG. 2 shows video screen 26 and support member 24 in an extended position. Video screen 26 is substantially flat and rectangular in shape. Video screen 26 is connected to support member 24 and support member 24 is in turn connected to housing 10 by arm assemblies 32. The term "video screen" as used infra may also refer to commerically available video monitors which may themselves have an outer housing. In such cases, it should be understood that connection is made to the outer housing of the monitor rather than to the screen element itself. Alternatively, screen 26 may refer to a mounting panel that is adapted to have a commercial monitor mounted thereon. Only one arm assembly 32 is shown in the drawings; the other arm assembly 32 is identical to the one shown and is located directly across from the one shown proximate side 18 of housing 10. The description of the arm assembly 32 shown should suffice. Arm assembly 32 consists of a large rectangular hollow section 34 and a smaller rectangular section 36. Hollow section 34 is connected to a front edge 38 of housing 10. Section 36 of arm assembly 32 is connected to end 68 of support member 24 by pin 42. Section 36 is housed in hollow section 34 so that section 36 can slide in and out of hollow section 34. Thus, support member 24 and video screen 26 which is attached to support member 24 can be housed in cavity 44 on the front side of housing 10 when section 36 is telescoped into hollow section 34 and can be extended from housing 10 by telescoping section 36 out of hollow section 34.

FIG. 2 also illustrates the capability of support member 24 and attached video screen 26 to rotate about a horizontal axis running through pins 42 on arm assemblies 32. Support member 24 rotates about pins 42 which connect support member 24 to arm assembly 32. Thus, back side 30 of support member 24 can face outward with respect to housing 10 or a front side 46 of video screen 26 can face outward with respect to housing 10. It will be appreciated that support member 24 and video screen 26 can be in any position intermediate these two positions by rotating support member 24 about pins 42 to a position where backside 30 of support member 24 and frontside 46 of video screen 26 are not parallel to the front side of housing 10.

Figure 3:
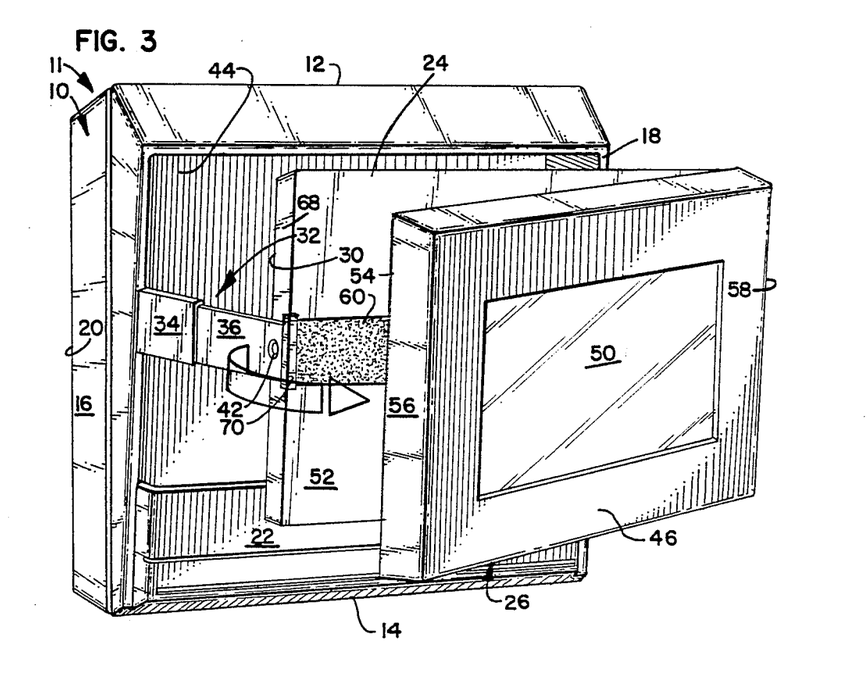
FIG. 3 is a perspective view illustrating the video screen of the preferred embodiment pivoting in a first direction in accordance with the principles of the present invention.
Figure 4:
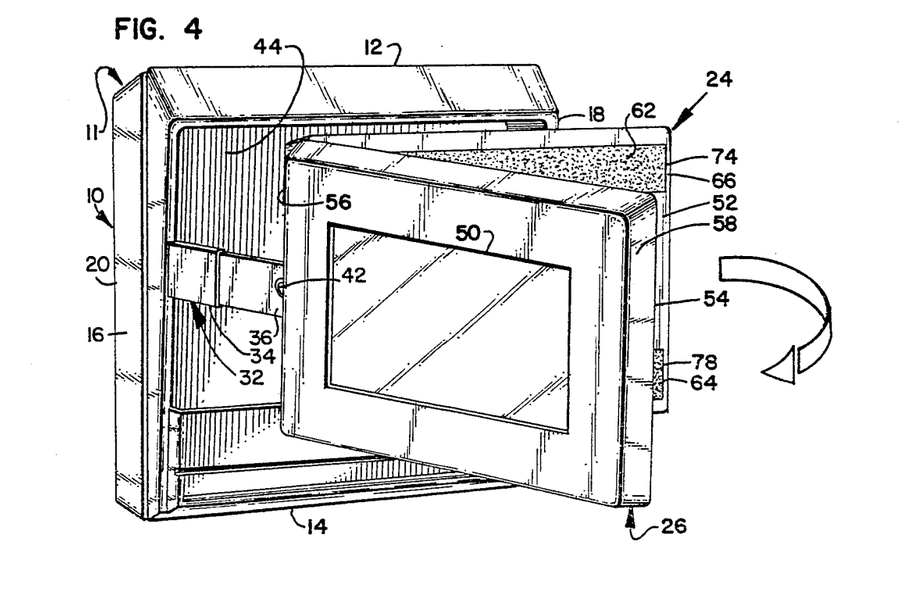
FIG. 4 is a perspective view illustrating the video screen of the preferred embodiment pivoting in a second direction in accordance with the principles of the present invention.

FIGS. 3 and 4 illustrate video screen 26 tilting to one side and to the other. Video screen 26 is rectangularly shaped and has a front side 46 with a screen 50, a backside 54, an end 56 and an end 58 opposite end 56. In the preferred embodiment, video screen 26 is a gas plasma display. Video screen 26 can have 256×512 pixels or up to 400×640 pixels. Video screen 26 has a 150° viewing angle, a 10:1 contrast ratio and a 40-foot Lamberts peak brightness. These features make the video screen easier to read than the traditional cathode ray tube displays and provide significantly better resolution. In the preferred embodiment, video screen 26 is very thin, for instance, as thin as 1.25 inches. Screen 50 is a truly flat screen and the memory capability and special circuitry of video screen 26 enables screen 50 to be free from flicker, jitter and edge distortion, all of which are typical problems of a cathode ray tube type display. Another advantage of video screen 26 of the preferred embodiment is that it does not subject users to radiation, implosion danger, or toxic chemicals if it is accidentally damaged. Screen 50 in the preferred embodiment, is capable of displaying 25 lines of 80 characters each. Video screen 26 is interconnected to electrical circuitry housed in section 22 of housing 10 by way of a ribbon cable or the like.

Video screen 26 is connected to support member 24 by arm 60 shown in FIG. 3 and by arms 62 and 64 shown in FIG. 4. The connections of arms 60, 62 and 64 to video screen 26 and support member 24 will be explained with reference to FIGS. 5 and 6. End 70 of arm 60 is hinged to front side 52 of support member 24 very close to end 68 of support member 24. End 72 of arm 60 is hinged to back side 54 of video screen 26 very close to end 58 of video screen 26. Arm 60 is not attached to support member 24 or video screen 26 anywhere other than that at ed 70 and 72. End 74 of arm 62 is hinged to front side 52 of support member 24 very close to end 66 of support member 24. End 76 of arm 62 is hinged to back side 54 of video screen 26 very close to end 56 of video screen 26. End 78 of arm 64 is hinged to front side 52 of support member 24 very close to end 66 of support 24. End 80 of arm 64 is hinged to back side 54 of video screen 26 very close to end 56 of video screen 26. Arms 62 and 64 are not connected to support member 24 and video screen 26 other than at ends 74, 76 and 78, 80, respectively. It is important to note that end 68 of support member 24 is not connected to end 56 of video screen 26 and that end 66 of support member 24 is not connected to end 58 of video screen 26. In fact, it should be noted that there is no direct connection between support member 24 and video screen 26, which are connected only by arms 60, 62 and 64. The hinges connecting arms 60, 62 and 64 to support member 24 and video screen 26 can be of one piece with arms 60, 62 and 64 or separate.

Figure 5:
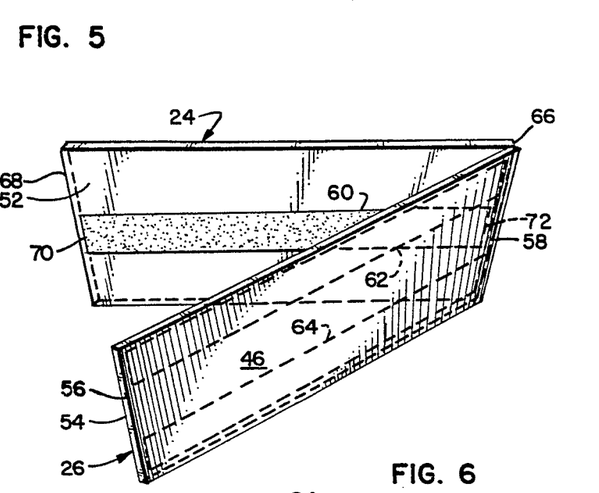
FIG. 5 is a diagrammatical view of the video screen pivoting as shown in FIG. 3 in accordance with the principles of the present invention.
Figure 6:
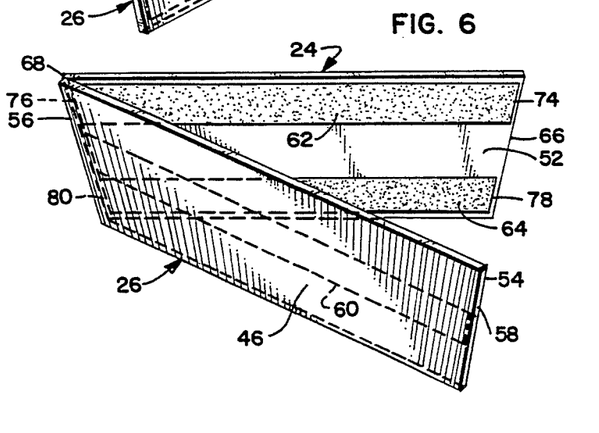
FIG. 6 is a diagrammatical view of the video screen pivoting as shown in FIG. 4 in accordance with the principles of the present invention.

The movement of arms 60, 62 and 64 can be seen with reference to FIGS. 5 and 6. In FIG. 5, video screen 26 is pivoting on hinges at end 72 of arm 60, end 74 of arm 62 and end 78 of arm 64. In FIG. 6, video screen 26 is pivoting on hinges at end 70 of arm 60, end 76 of arm 62 and end 80 of arm 64. In FIG. 5, arm 60 is parallel to and adjacent front side 52 of support member 24 and arms 62, 64 are parallel to and adjacent back side 54 of video screen 26. In FIG. 6, arm 60 is now parallel to and adjacent back side 54 of video screen 26 and arms 62, 64 are parallel to and adjacent front side 52 of support member 24.

Figure 7:
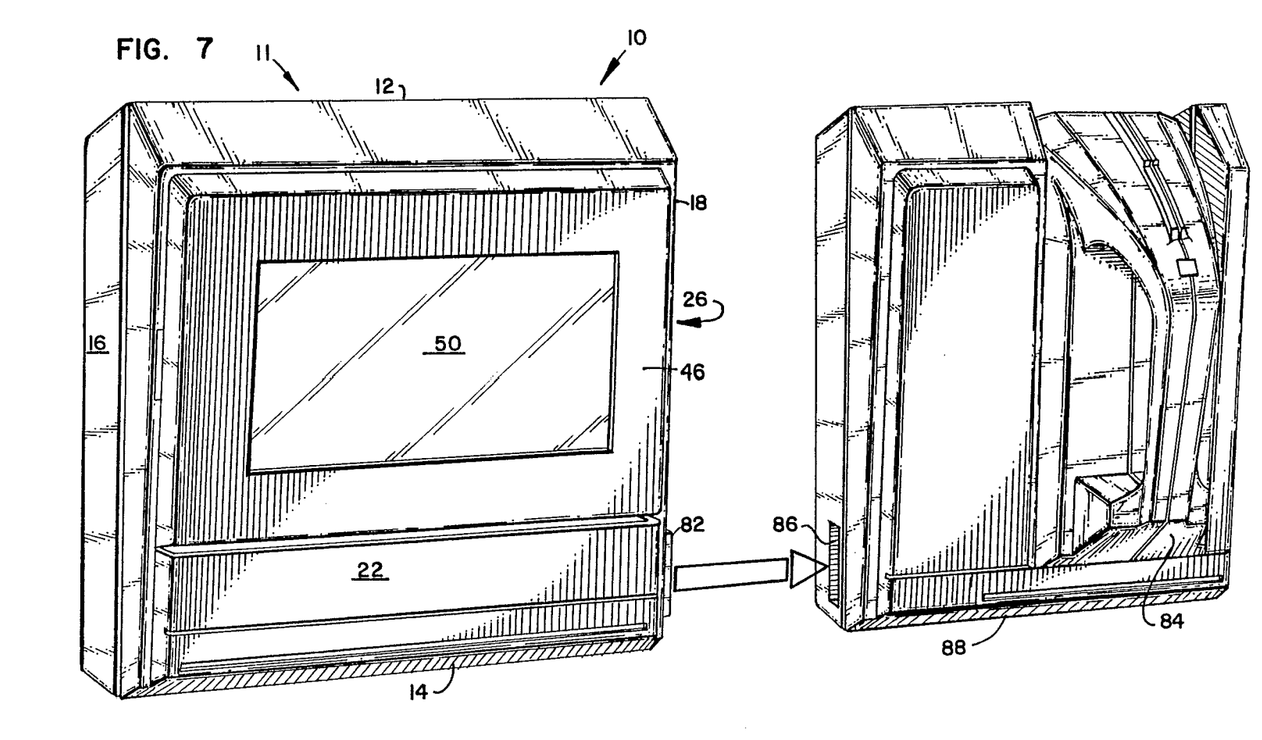
FIG. 7 is a perspective view illustrating the connection of the flat panel display monitor to the base unit of a data input device in accordance with the principles of the present invention.

FIG. 7 shows the compatibility of monitor 11 with data input devices. The data input device shown in FIG. 7 is the portable handheld terminal disclosed in applicant's U.S. patent application Ser. No. 862,149. Monitor 11 has a communication port 82 for electrically interconnecting monitor 11 to base unit 88 which houses portable handheld terminal 84 when terminal 84 is not in use. Communication port 82 on monitor 11 connects to communication port 86 on base unit 88. Terminal 84 has integrated keypad, display and optical bar code read functions, a handle design which facilitates ease of use and also includes electromagnetic transceiver means for wireless transmission of data to and from base unit 88. Terminal 84 has its own rechargeable power supply which can be recharged at base unit 88. The bar code reader of terminal 84 is self-scanning in both the X and Y directions, is capable of reading bar codes on curved as well as flat surfaces, can read characters as well as bar codes and can discriminate between different bar code standards. Thus, a hospital staff member using terminal 84 in conjunction with monitor 11 of the present invention can read a bar code on a medication package, for instance, with portable terminal 84 anywhere in the room. Terminal 84 transmits this information to base unit 88 via radio frequency signals. Base unit 88 in turn communicates this information to monitor 11 via communication ports 86 and 82. The hospital staff member can then readily read monitor 11 from any location in the room to determine what the medical type and dosage is and whether it matches what was prescribed.

A hospital staff member can also use portable terminal 84 and monitor 11 to input data to a central computer which is hardwired to a plurality of base units. The staff member can use the keyboard on terminal 84 to input the data to base unit 88. This data would be displayed on monitor 11 and could be transferred to the central computer. It should also be noted that information received at base unit 88 from the central computer can be displayed on monitor 11 via the communication ports 86 and 82.

Monitor 11 can be removably attached to a wall and a data input device as shown in FIG. 7. Thus, a hospital staff member could disconnect ports 82 and 86 and remove monitor 11 from the wall in one hospital room and move monitor 11 to another hospital room where it could be reconnected to the wall and a data input device via port 82.

Furthermore, monitor 11 can also be configured to be portable within a hospital room. Portable monitor 11 would have its own power source and would communicate with a data input device via radio frequency signals. Thus, a hospital staff member could place monitor 11 any place within the room and still communicate with a data input device.

Figure 8:
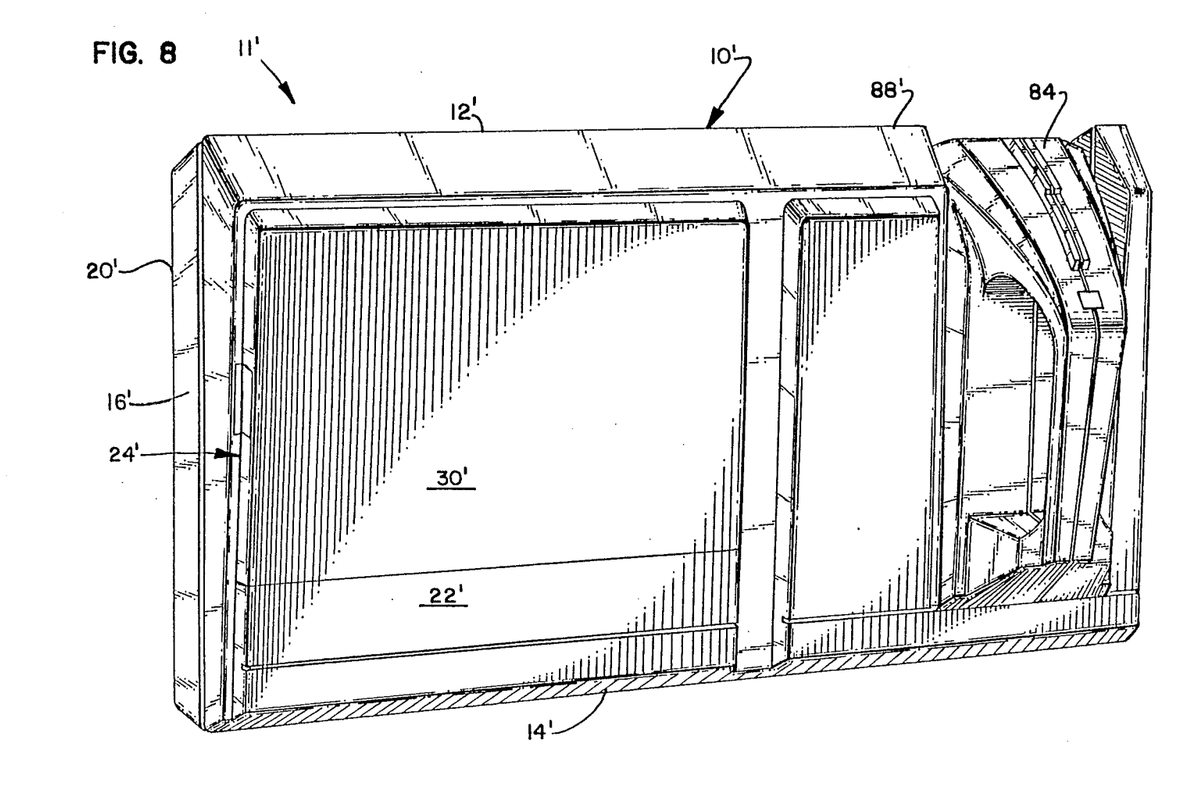
FIG. 8 is a perspective view illustrating the permanent connection of the flat panel display monitor to the base unit of a data input device in accordance with the principles of the present invention.

The monitor and the base unit of the data input device can also be one unit. FIG. 8 shows monitor 11' and base unit 88', which houses a portable handheld terminal 84, as one integral unit. The circuitry of monitor 11' and base unit 88' would then be internally electrically interconnected.

Flat panel display monitor 11 provides a display for a bedside computer system that can be wall-mounted and therefore does not take up any valuable space in a hospital room. Monitor 11 provides the hospital staff with the capability of displaying relevant data about the patient such as patient care plans, assessments, lab results, vital sign plots and medication profiles, as well as other patient data.

Flat panel display monitor 11 also provides a display that while wall-mounted, is capable of tilting so that a hospital staff member can view the display from any location within a patient's room. The capability of tilting the display allows for the privacy of patient data when there is more than one patient in the hospital room and it also allows a hospital staff member to view the display without allowing the patient to view it.

The present invention also provides a display that is compact and portable so that it can easily be moved from one patient's room to another and mounted on the wall in the new location.

Figure 9:
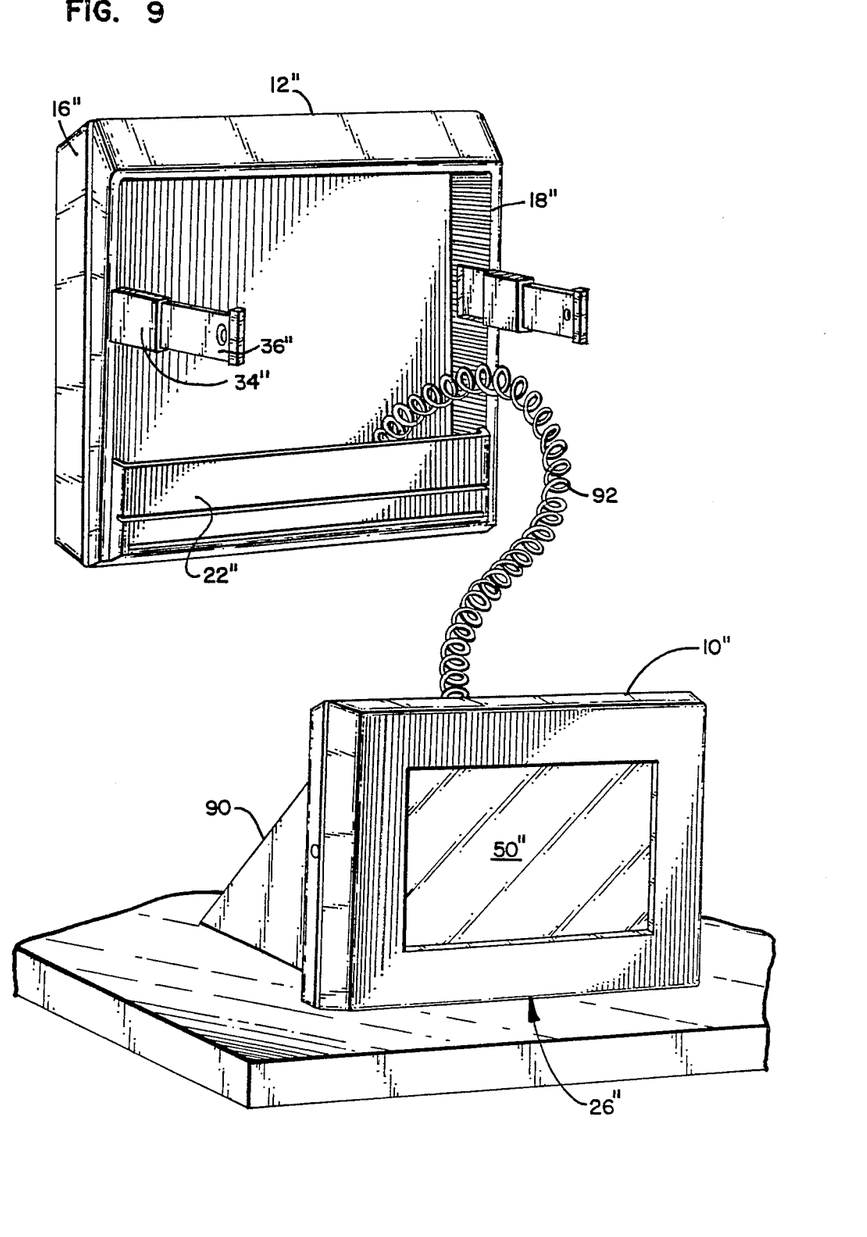
FIG. 9 is a schematic view of an alternate embodiment of the present invention wherein the video screen 26 is removable from the housing 10.

In yet another embodiment of the present invention, the video screen 26" is removable from the housing 10" and includes a support structure 90 for supporting the video screen in an upright position on a flat surface such as a table top. The video screen 26' is suitably interconnected to the housing 10" by an electrical cord 92. This embodiment of the invention allows the video screen 26" to be used at various locations removed from the housing 10".

In yet alternate embodiments of the display monitor 11 of the present invention, wireless communication such as via an rf transceiver may be utilized to communication with input devices such as the portable handheld terminal 84.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. An adjustable mounting for a flat panel display monitor for pivotally supporting a monitor in a first position, a second position and a third position, the first position being itnermedaite the sescond and third positions, comprising:

a housing having a front side, a back side and first and second oppositely facing ends;

means adapted for mounting a substantially flat video screen member, said screen mounting means having a front side, a back side and first and second oppositely facing ends;

a first substantially flat arm member;

first connecting means for pivotally connecting a first end of said first arm member to said first end of said housing and for pivotally connecting a second end of said first arm member to said second end of said screen mounting means;

a second substantially flat arm member; and second connecting means for pivotally connecting a first end of said second arm member to said second end of said housing and for pivotally connecting a second end of said second arm member to said first end of said screen mounting means, so that the first arm member will pivot with the screen mounting means and the second arm will be parallel to the housing when the screen mounting means is pivoted form the first to the second position, and the first arm will be parallel to the housing while the second arm pivots with the screen mounting means when the screen mounting means is pivoted form the first to the third position, whereby the screen mounting means is simply and conveniently adjustable for a viewer.

2. A display monitor according to claim 1, wherein the housing includes a first stationary housing portion and a second movable housing portion, the screen mounting means being attached to the second housing portion, the first and second housing portions each having front and back sides and first and second oppositely facing ends, the first and second housing portions being interconnected by extensible mounting means for supporting the second housing portion in an extended position and an unextended position, the unextended position being one in which the second housing portion and the screen mounting means are positioned adjacent the front side of the first housing portion and the extended position being one in which the second housing portion and the screen mounting means are displaced from the first housing portion.

3. A display monitor in accordance with claim 2, wherein the second housing portion and its associated screen mounting means are rotatably interconnected to the extensible mounting means for rotatable movement of the second housing portion and its associated screen mounting means about an axis parallel to the front side of the first housing portion, whereby either the front side of the screen mounting means or the back side of the second housing portion face outwardly away from the front side of the first housing portion.

4. A display in accordance with claim 3, wherein he extensible first mounting means is interconnected to the second housing by a pin member.

5. A display in accordance with claim 1, wherein the housing has a communication port for electrical interconnection of the display monitor to a data input device.

6. A display monitor in accordance with claim 1, wherein the first and second connecting means each comprise a pair of hinge members.

7. A flat panel display monitor comprising:

a housing having a front side and a back side and first and second oppositely facing ends;

a support member having a front side and a back side and first and second oppositely facing ends;

first mounting means for attaching the support member to the housing;

means adapted for mounting a substantially flat video screen member, said screeb mounting means having a front side and a back side and first and second oppositely facing ends;

connecting means for mounting the support member to the screen mounting means so that the screen mounting means can be in one of three positions with respect to the support member, the first position being one in which the front side of the support member and the back side of the screen mounting means are facing one another and lying in substantially parallel planes, the second position being one in which the second end of the support member and the second end of the screen mounting means are separated and the first end of the support member and the first end of the screen mounting means are in close proximity and the third position being one in which the first end of the support member and the first end of the screen mounting means are separated and the second end of the support member and the second end of the screen mounting means are in close proximity, said connecting means including a first substantially flat ar member, first connecting means for pivotally connecting one end of the first arm member to the first end of the support member and for pivotally connecting the other end of the first arm member to the second end of the screen mounting means, a second substantially flat arm member, and second connecting means for pivotally connecting one end of the second arm member to the second end of the support member and for pivotally connecting the other end of the second arm member to the first end of the screen mounting means, the first end of the support member not being connected to the first end of the screen mounting means and the second end of the screen mounting means, whereby the screen mounting means is pivotable to the second position and to the third position, the first arm member pivoting with the screen mounting means when the screen mounting means is pivoted form the first position to the second position and remaining stationary when the screen mounting means is pivoted from the first position to the third position, the second arm member pivoting with the screen mounting means when the screen mounting means is pivoted form he first position to the third position and remaining stationary when the screen mounting means is pivoted from the first position to the second position.

8. A display monitor in accordance with claim 7, wherein the first mounting means attaches the support member to the housing so that the support member and the screen mounting means can be in one of two positions with respect to the housing, the first position being one in which the support member and the screen mounting means are positioned immediately adjacent the front side of the housing and the second position being one in which the support member and the screen mounting means are extended from the housing with the front side of the support member and the front side of the housing being substantially parallel.

9. A display monitor in accordance with claim 8, wherein the first mounting means includes extensible arm means interconnected to the housing and the support member for supporting the support member relative to the housing.

10. A display monitor in accordance with claim 9, wherein the extensible arm means includes:

a large, hollow arm attache to the front side of the housing and substantially perpendicular to the housing; and a small arm attached to the support member and substantially perpendicular to the support member and slideably connected to the large arm so that the small arm can telescope in and out of the large arm so that the small arm can telescope in and out of the large arm whereby the support member an the screen mounting means can be in the first or second position with respect to the housing.

11. A display monitor in accordance with claim 7, wherein the first mounting means is rotatably interconnected to the support member for rotation of the support member and the screen mounting means about a horizontal axis so that either the front said of the screen mounting means or the back side of the support member faces outward with respect to the front side of the housing.

12. A display monitor in accordance with claim 11, wherein the mounting means includes a pin for pivotally connecting the first mounting means to the support member.

13. A display monitor in accordance with claim 7 further including:
a third substantially flat arm member;
third connecting means for pivotally connecting one end of the third arm member to the second end of the support member and for pivotally connecting the other end of the third arm member to the first end of the screen mounting means, the third arm member being connected so that the first arm member is intermediate the second arm member and the third arm member, whereby the third arm member pivots in the same manner as the second arm member.

14. A display monitor in accordance with claim 7, wherein the first an second connecting means each comprise a pair of hinges.

15. A display monitor in accordance with claim 14, wherein the hinges are of one piece with the first an second arm members.

16. A display monitor in accordance with claim 7, wherein the first and second arm members extend parallel to one another when the screen member is in the first position.

17. An adjustable mounting for a flat panel display monitor for pivotally supporting the monitor in a first position, a second position and a third position, the first position being intermediate the second and third positions, comprising:
a housing having a front side, a back side and first and second oppositely facing ends;
a substantially flat video screen member supported by the housing and having a front side and a back side and first and second oppositely facing ends;
a first substantially flat arm member;
first connecting means for pivotally connecting a first end of said first arm member to said first end of said housing and for pivotally connecting a second end of said first arm member to said second end of said screen member;
a second substantially flat arm member; and
second connecting means for pivotally connecting a first end of said second arm member to said second end of said housing and for pivotally connecting a second end of said second arm member to said first end of said screen member, so that the first arm member will pivot with the screen member and the second arm will be parallel to the housing when the screen member is pivoted form the first to the second position, and the first arm will bar parallel to the housing while the second arm pivots with the screen member when the screen member is pivoted from the first to the third position, whereby the screen member is simply and conveniently adjustable for a viewer.

18. A display monitor in accordance with claim 17 wherein the housing has a communication port so that the display monitor can be electrically interconncted to said data input device.

19. A display monitor in accordance with claim 17, wherein the screen member includes plasma display means for displaying data on the screen member.

* * * * *

UNITED STATES PATENT AND TRADEMARK OFFICE
CERTIFICATE OF CORRECTION

PATENT NO. : 4,814,759

DATED : March 21, 1989

INVENTOR(S) : Gombrich et al.

It is certified that error appears in the above-identified patent and that said Letters Patent is hereby corrected as shown below:

itle Page, Under U.S. PATENT DOCUMENTS, Line 1, "2,825,152 0/1954 Baylon" should be --2,825,152 3/1958 Baylon--.

ol. 1, Line 45, after "position" insert --is defined as--.

ol. 4, Line 49, "ed" should be --end--.

ol. 6, Line 31, "26'" should be --26"--.

ol. 6, Lines 38-39, "communication" should be --communicate--.

ol. 6, Line 55, "itnermedaite" should be --intermediate--.

ol. 6, Line 55, "sescond" should be --second--.

ol. 7, Lines 10 and 13, "form" should be --from--.

ol. 7, Line 43, "he" should be --the--.

ol. 7, Line 44, delete "first".

ol. 7, Line 61, "screeb" should be --screen--.

ol. 8, Line 14, "ar" should be --arm--.

ol. 8, Lines 32 and 38, "form" should be --from--.

ol. 8, Line 38, "he" should be --the--.

ol. 8, Line 61, "attache" should be --attached--.

ol. 8, Line 68 - Col. 9, Line 1, delete "so that the small arm an telescope in and out of the large arm".

UNITED STATES PATENT AND TRADEMARK OFFICE
CERTIFICATE OF CORRECTION

PATENT NO. : 4,814,759

DATED : March 21, 1989

INVENTOR(S) : Gombrich et al.

It is certified that error appears in the above-identified patent and that said Letters Patent is hereby corrected as shown below:

Col. 9, Line 1, "an" should be --and--.

Col. 9, Line 8, "said" should be --side--.

Col. 9, Line 13, after "the" insert --first--.

Col. 9, Lines 31 and 34, "an" should be --and--.

Col. 10, Line 25, "form" should be --from--.

Col. 10, Line 26, "bar" should be --be--.

Col. 10, Line 35, "said" should be --a--.

Signed and Sealed this

Thirteenth Day of February, 1990

*Attest:*

JEFFREY M. SAMUELS

*Attesting Officer*   Acting Commissioner of Patents and Trademarks